US012699913B2

(12) United States Patent
Rigetti et al.

(10) Patent No.: US 12,699,913 B2
(45) Date of Patent: Aug. 4, 2026

(54) COMPUTING PLATFORM WITH HETEROGENOUS QUANTUM PROCESSORS

(71) Applicant: Rigetti & Co, LLC, Berkeley, CA (US)

(72) Inventors: Chad Tyler Rigetti, Walnut Creek, CA (US); William J. Zeng, Berkeley, CA (US); Blake Robert Johnson, El Cerrito, CA (US); Nikolas Anton Tezak, Oakland, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 0 days.

(21) Appl. No.: 18/953,748

(22) Filed: Nov. 20, 2024

(65) Prior Publication Data

US 2026/0127473 A1     May 7, 2026

Related U.S. Application Data

(63) Continuation of application No. 17/097,955, filed on Nov. 13, 2020, now Pat. No. 12,182,661, which is a
(Continued)

(51) Int. Cl.
*G06N 10/20*         (2022.01)
*G06F 13/16*         (2006.01)
(Continued)

(52) U.S. Cl.
CPC ......... *G06N 10/40* (2022.01); *G06F 13/1663* (2013.01); *G06F 15/16* (2013.01);
(Continued)

(58) Field of Classification Search
CPC .... G06N 10/20; G06N 10/00; G06F 13/1663; G06F 15/16
See application file for complete search history.

(56) References Cited

U.S. PATENT DOCUMENTS

| | | | |
|---|---|---|---|
| 5,428,761 A | 6/1995 | Herlihy et al. | |
| 5,940,193 A | 8/1999 | Hotaling et al. | |

(Continued)

FOREIGN PATENT DOCUMENTS

| | | |
|---|---|---|
| CN | 105787292 | 7/2016 |
| WO | 2005122052 | 12/2005 |

(Continued)

OTHER PUBLICATIONS

Travis Humble, Systems and Software for Quantum Computing, Presented to North Carolina State University and Google Hangouts, Feb. 27, 2018 (Year: 2018).*
(Continued)

*Primary Examiner* — Joseph D Torres
(74) *Attorney, Agent, or Firm* — Henry Patent Law Firm PLLC

(57) ABSTRACT

A hybrid quantum-classical platform comprises: a first quantum processor unit (QPU); a second QPU; and a shared classical memory, the shared classical memory being connected to both the first QPU and the second QPU, wherein the shared classical memory is configured to share data between the first QPU and the second QPU. In some embodiments, the first QPU operates at a higher repetition rate and/or clock rate than the second QPU and the second QPU operates with a higher fidelity than the first QPU.

20 Claims, 10 Drawing Sheets

Related U.S. Application Data continuation of application No. PCT/US2019/033145, filed on May 20, 2019.

(60) Provisional application No. 62/673,658, filed on May 18, 2018.

(51) Int. Cl.

| | |
|---|---|
| *G06F 15/16* | (2006.01) |
| *G06N 10/00* | (2022.01) |
| *G06N 10/40* | (2022.01) |
| *G06N 10/70* | (2022.01) |
| *G06F 9/54* | (2006.01) |

(52) U.S. Cl.
CPC ............. *G06N 10/00* (2019.01); *G06N 10/20* (2022.01); *G06N 10/70* (2022.01); *G06F 9/544* (2013.01)

(56) References Cited

U.S. PATENT DOCUMENTS

| | | | |
|---|---|---|---|
| 6,418,460 | B1 | 7/2002 | Bitar et al. |
| 7,875,876 | B1 | 1/2011 | Wandzura et al. |
| 8,175,995 | B2 | 5/2012 | Amin |
| 8,832,164 | B2 | 9/2014 | Allen et al. |
| 8,832,165 | B2 | 9/2014 | Allen et al. |
| 9,286,154 | B2 | 3/2016 | Ashikhmin |
| 9,819,347 | B2 | 11/2017 | Hastings et al. |
| 10,127,499 | B1 | 11/2018 | Rigetti et al. |
| 10,402,743 | B1 | 9/2019 | Rigetti et al. |
| 10,633,248 | B2 | 4/2020 | Ashikhmin |
| 10,650,324 | B1 | 5/2020 | Rigetti et al. |
| 10,671,559 | B2 | 6/2020 | Mohseni et al. |
| 10,698,789 | B1 | 6/2020 | Liu et al. |
| 10,956,830 | B1 | 3/2021 | Rigetti et al. |
| 10,984,152 | B2 | 4/2021 | Rubin et al. |
| 11,941,482 | B1 | 3/2024 | Rigetti et al. |
| 2005/0005266 | A1 | 1/2005 | Datig |
| 2005/0182614 | A1 | 8/2005 | Meredith |
| 2005/0188373 | A1 | 8/2005 | Inoue et al. |
| 2005/0273306 | A1 | 12/2005 | Hilton et al. |
| 2006/0101236 | A1 | 5/2006 | Han |
| 2006/0179255 | A1 | 8/2006 | Yamazaki |
| 2006/0224547 | A1 | 10/2006 | Ulyanov et al. |
| 2007/0239366 | A1 | 10/2007 | Hilton et al. |
| 2008/0209156 | A1 | 8/2008 | Inoue et al. |
| 2009/0070402 | A1 | 3/2009 | Rose et al. |
| 2009/0075825 | A1 | 3/2009 | Rose et al. |
| 2009/0157778 | A1 | 6/2009 | Allen et al. |
| 2009/0164435 | A1 | 6/2009 | Routt |
| 2011/0137632 | A1 | 6/2011 | Paxson et al. |
| 2011/0238378 | A1 | 9/2011 | Allen et al. |
| 2011/0313741 | A1 | 12/2011 | Langhoff |
| 2012/0079177 | A1 | 3/2012 | Brewer et al. |
| 2012/0192200 | A1 | 7/2012 | Rao et al. |
| 2012/0254586 | A1 | 10/2012 | Amin et al. |
| 2013/0160016 | A1 | 6/2013 | Gummaraju et al. |
| 2013/0222399 | A1 | 8/2013 | Bourd et al. |
| 2013/0332702 | A1 | 12/2013 | Boudier |
| 2014/0164313 | A1 | 6/2014 | Alboszta et al. |
| 2014/0187427 | A1 | 7/2014 | Macready et al. |
| 2014/0229722 | A1 | 8/2014 | Harris |
| 2014/0297247 | A1 | 10/2014 | Troyer et al. |
| 2014/0354326 | A1 | 12/2014 | Bonderson et al. |
| 2015/0006443 | A1 | 1/2015 | Rose et al. |
| 2015/0142398 | A1 | 5/2015 | Miller et al. |
| 2017/0017894 | A1 | 1/2017 | Lanting et al. |
| 2017/0161632 | A1 | 6/2017 | Freedman et al. |
| 2017/0179960 | A1 | 6/2017 | Hastings et al. |
| 2017/0223143 | A1 | 8/2017 | Johnson et al. |
| 2017/0270245 | A1* | 9/2017 | van Rooyen .......... G16B 50/30 |
| 2017/0293556 | A1 | 10/2017 | Rozario |
| 2018/0096085 | A1 | 4/2018 | Rubin |
| 2018/0114138 | A1 | 4/2018 | Monroe et al. |
| 2018/0121601 | A1* | 5/2018 | Hahm .................... G16B 30/10 |
| 2021/0272003 | A1 | 9/2021 | Rigetti et al. |
| 2021/0406421 | A1 | 12/2021 | Rubin |
| 2022/0390496 | A1 | 12/2022 | Aksyuk et al. |
| 2023/0289643 | A1* | 9/2023 | Jain ......................... G06Q 10/04 |
| 2025/0218542 | A1* | 7/2025 | Van Rooyen .......... G16B 50/00 |

FOREIGN PATENT DOCUMENTS

| | | |
|---|---|---|
| WO | 2013006836 | 1/2013 |
| WO | 2018064535 | 4/2018 |
| WO | 2019222748 | 11/2019 |

OTHER PUBLICATIONS

Reiher , et al., "Elucidating Reaction Mechanisms on Quantum Computers", arXiv:1605.03590v2 [quant-ph], May 25, 2016, 28 pgs.

Rubin , "A Hybrid Classical/Quantum Approach for Large-Scale Studies of quantum Systems with Density Matrix Embedding Theory", arXiv:1610.06910v1, Oct. 21, 2016, 12 pgs.

Rubin , "A Hybrid Classical/Quantum Approach for Large-Scale Studies of Quantum Systems with Density Matrix Embedding Theory", arXiv:1610.06910v2, Oct. 24, 2016, 10 pgs.

Sawaya , et al., "Error Sensitivity to Environmental Noise in Quantum Circuits for Chemical State Preparation", Journal of Chemical Theory and Computation, ACS Publications, Jun. 2, 2016, 13 pgs.

Scuseria , et al., "An efficient reformulation of the closed-shell coupled cluster single and double excitation (CCSD) equations", J. Chem. Phys. 89(12), Dec. 15, 1988, 7 pgs.

Seeley , et al., "The Bravyi-Kitaev transformation for quantum computation of electronic structure", The Journal of Chemical Physics 137, 224109, Dec. 12, 2012, 17 pgs.

Selinger , et al., "A lambda calculus for quantum computation with classical control", arXiv:cs/0404056v2 [cs.LO], Nov. 2004, 15 pgs.

Shiba , "Magnetic Susceptibility at Zero Temperature for the One-Dimensional Hubbard Model", Physical Review B, vol. 6, No. 3, Aug. 1, 1972, 10 pgs.

Smith, R. S., et al., "A Practical Quantum Instruction Set Architecture", arXiv:1608.03355v2 [quant-ph], Feb. 17, 2017, 15 pages.

Suzuki , "Convergence of General Decompositions of Exponential Operators", Commun. Math. Phys. 163, 491-508, 1994, 19 pgs.

Szabo , et al., "Modern Quantum Chemistry: Introduction to Advanced Electronic Structure Theory", Macmillan Publishing Co., Inc., 1982, 48 pgs.

Tranter , et al., "The Bravyi-Kitaev Transformation: Properties and Applications", Int'l Journal of Quantum Chemistry 115, 1431-1441, 2015, 12 pgs.

Trotter , "On the Product of Semi-Groups of Operators", Proceedings of the American Mathematical Society 10, 545, 1959, 7 pgs.

Tsuchimochi , et al., "Density matrix embedding in an antisymmetrized geminal power bath", The Journal of Chemical Physics 143, 024107, 2015, 12 pgs.

Van Meter, Rodney , et al., "Local and Distributed Quantum Computation", arXiv:1605.06951v1, May 2016.

Verdon , et al., "A quantum algorithm to train neural networks using low-depth circuits", arXiv:1712.05304v1, Dec. 14, 2017, 8 pgs.

Wang , et al., "Quantum Simulation of Helium Hydride Cation in a Solid-State Spin Register", ACS Nano, vol. 9, No. 8, 7769-7774, www.acsnano.org, Apr. 23, 2015, 14 pgs.

Wecker, Dave , et al., "Towards Practical Quantum Variational Algorithms", arXiv:1507.08969v2 [quant-ph], Sep. 8, 2015, 11 pages.

Werner , et al., "A second order multiconfiguration SCF procedure with optimum convergence", J. Chem. Phys. 82 (11), Jun. 1, 1985, 12 pgs.

Whitfield, James D., et al., "Simulation of Electronic Structure Hamiltonians Using Quantum Computers", arXiv:1001.3855v3 [quant-ph], Dec. 19, 2010, 22 pages.

Wiebe , et al., "Quantum Deep Learning", arXiv:1412.3489v2 [quant-ph], May 2015, 34 pgs.

(56) References Cited

OTHER PUBLICATIONS

Wiebe , et al., "Quantum Hamiltonian Learning Using Imperfect Quantum Resources", arxiv:1311.5269v2, Apr. 1, 2014, 18 pgs.

Wouters , et al., "A Practical Guide to Density Matrix Embedding Theory in Quantum Chemistry", J.Chem. Theory Comput., May 9, 2016, 15 pgs.

Wouters, Sebastian , et al., "Five years of density matrix embedding theory", arXiv:1605.05547v1, Mar. 2016.

Zheng, Bo-Xiao , et al., "Cluster size convergence of the density matrix embedding theory and its dynamical cluster formulation: a study with an auxiliary-field quantum Monte Carlo solver", arXiv:1608. 03316v1 [cond-mat.str-el], Aug. 11, 2016, 14 pgs.

Zheng , et al., "Ground-state phase diagram of the square lattice Hubbard model from density matrix embedding theory", arXiv:1504. 01784v3 [cond-mat.str-el], May 21, 2015, 17 pgs.

EPO, Communication pursuant to Article 94(3) issued in Application No. 19803895.2 on Oct. 14, 2025, 10 pages.

EPO, Extended European Search Report mailed Feb. 18, 2022, in EP 19803895.2, 10 pgs.

KIPO, International Search Report and Written Opinion mailed Sep. 11, 2019, in PCT/US2019/033145, 14 pgs.

USPTO, Restriction Requirement issued in U.S. Appl. No. 17/097,955 on Feb. 23, 2024, 16 pages.

USPTO, Non-Final Office Action issued in U.S. Appl. No. 17/097,955 on May 16, 2024, 26 pages.

USPTO, Notice of Allowance issued in U.S. Appl. No. 17/097,955 on Aug. 23, 2024, 6 pages.

"Parallel computing—Wikipedia", https://en.wikipedia.org/w/index. php?title=Parallel_computing&oldid=741532971 (retrieved on Mar. 31, 2021), Sep. 28, 2016, 20 pgs.

"Python-based Simulations of Chemistry Framework", available at https://github.com/sunqm/pyscf at least as early as Feb. 8, 2021, 4 pgs.

Advanced Micro Devices, Inc. , "What is Heterogeneous Computing", AMD Developer Central; http://developer.amd.com/resources/ heterogenous-computing/what-is-heterogeneous-computing/; copyright 2014; accessed Aug. 9, 2015, 7 pgs.

Amin , et al., "Quantum Boltzmann Machine", Phys. Rev. X 8, 021050, May 23, 2018, 11 pgs.

Bauer, Bela , et al., "Hybrid quantum-classical approach to correlated materials", 1510.03859v2 [quant-ph], Aug. 29, 2016, 11 pgs.

Booth , et al., "Spectral functions of strongly correlated extended systems via an exact quantum embedding", Physical Review B91, 155107, 2015, 7 pgs.

Bravyi , et al., "Improved Classical Simulation of Quantum Circuits Dominated by Clifford Gates", arXiv:1601.07601v2 [quant-ph], Jan. 27, 2017, 20 pgs.

Bravyi , et al., "Trading classical and quantum computational resources", arXiv:1506.01396v1 [quant-ph], Jun. 3, 2015, 14 pgs.

Bravyi , et al., "Universal quantum computation with ideal Clifford gates and noisy ancillas", Phys. Rev. A 71, 022316, Feb. 22, 2005, 14 pgs.

Britt, Keith A., et al., "High-Performance Computing with Quantum Processing Units", ACM Journal on Emerging Technologies in Computing Systems, vol. 1 No. 1 Art. 1, Feb. 2017, 13 pages.

Britt, Keith A., et al., "High-Performance Computing with Quantum Processing Units", arXiv:1511.04386v1, 2015.

Brown , et al., "Fault-tolerant error correction with the gauge color code", Nature Communications, Jul. 29, 2016, 8 pgs.

Bulik , et al., "Can single-reference coupled cluster theory describe static correlation?", arXiv:1505.01894v1 [physics.chem-ph] May 8, 2015, May 11, 2015, 10 pgs.

Bulik , et al., "Density matrix embedding from broken symmetry lattice mean fields", Physical Review B89, 035140, 2014, 13 pgs.

Bulik , "Electron correlation in extended systems via quantum embedding", Doctoral thesis, Rice University, May 2015, 118.

Bulik , et al., "Electron correlation in solids via density embedding theory", The Journal of Chemical Physics 141, 054113, 2014, 11 pgs.

Corcoles , et al., "Process verification of two-qubit quantum gates by randomized benchmarking", Physical Review A 87, 030301(R)(2013), Mar. 19, 2013, 4 pgs.

Crawford , et al., "An Introduction to Coupled Cluster Theory for Computational Chemists", Reviews in Computational Chemistry, vol. 14, 2000, 105.

Dallaire-Demers, Pierre-Luc , et al., "Quantum gates and architecture for the quantum simulation of the Fermi-Hubbard model", arXiv:1606.00208v1 [quant-ph], Jun. 2, 2016, 13 pgs.

Gidofalvi , et al., "Multireference self-consistent-field energies without the many-electron wave function through a variational low-rank two-electron reduced-density-matrix method", The Journal of Chemical Physics 127, 244105, Dec. 28, 2007, 7 pgs.

Gottesman , et al., "Demonstrating the viability of universal quantum computation using teleportation and single-qubit operations", Nature 402(6760), Nov. 25, 1999, 7 pgs.

Helgaker , et al., "Molecular Electronic-Structure Theory", John Wiley & Sons Ltd., West Sussex, England, 2000, 8 pgs.

Hosteny , et al., "Ab initio study of the pi-electron states of trans-butadiene", The Journal of Chemical Physics, vol. 62, No. 12, Jun. 15, 1975, 17 pgs.

Humble, Travis , "Systems and Software for Quantum Computing", Presented to North Carolina State University and Google Hangouts, Feb. 27, 2018, 42 pages.

Hutter , et al., "Efficient Markov chain Monte Carlo algorithm for the surface code", Phys. Rev. A 89, 022326, Feb. 18, 2014, 28 pgs.

Johnson , et al., "QVECTOR: an algorithm for device-tailored quantum error correction", arXiv:1711.02249v1 [quant-ph], Nov. 7, 2017, 16 pgs.

Kimmel , et al., "Robust Extraction of Tomographic Information via Randomized Benchmarking", Phys. Rev. X 4, 011050, Mar. 25, 2014, 15 pgs.

Knizia , et al., "Density Matrix Embedding: A Simple Alternative to Dynamical Mean-Field Theory", Physical Review Letters PRL 109, 186404, Nov. 2, 2012, 6 pgs.

Knizia , et al., "Density Matrix Embedding: A Strong-Coupling Quantum Embedding Theory", Journal of Chemical Theory and Computation, Feb. 21, 2013, 6 pgs.

Kretchmer , et al., "A real-time extension of density matrix embedding theory for non-equilibrium electron dynamics", arXiv:1609. 07678v2, Nov. 1, 2017, 15 pgs.

Kreula , et al., "Few-qubit quantum-classical simulation of strongly correlated lattice fermions", EPJ Quantum Technology 3:11, 2016, 19 pgs.

Lanyon , et al., "Experimental quantum computing without entanglement", arXiv:0807.0668v1, Jul. 4, 2008, 5 pgs.

Li , et al., "Hybrid parallel tempering and simulated annealing method", Applied Mathematics and Computation, vol. 212, Issue 1, pp. 216-228, Jun. 1, 2009.

Lieb , et al., "The one-dimensional Hubbard model: a reminiscence", Physica A 321; www.elsevier.com/locate/physa, 2003, 27 pgs.

Magesan , et al., "Scalable and Robust Randomized Benchmarking of Quantum Processes", Physical Review Letters 106, 180504, May 6, 2011, 4 pgs.

Mccaskey , et al., "Extreme-Scale Programming Model for Quantum Acceleration within High Performance Computing", arxiv.org, Cornell University Library, Oct. 4, 2017, 20 pgs.

Mcclean, Jarrod Ryan, "Algorithms Bridging Quantum Computation and Chemistry", Doctoral dissertation, Harvard University, Graduate School of Arts & Sciences; http://nrs.harvard.edu/urn-3:HUL.InstRepos:17467376, May 1, 2015, 245 pgs.

Mcclean, J. R., et al., "Hybrid Quantum-Classical Hierarchy for Mitigation of Decoherence and Determination of Excited States", arXiv:1603.05681v1 [quant-ph], Mar. 17, 2016, 10 pgs.

Mcclean, et al., "The theory of variational hybrid quantum-classical algorithms", New J. Phys. 18 (2016)023023, Feb. 5, 2016, 23 pgs.

Neilsen , et al., "Quantum Computation and Quantum Information", Cambridge University Press; Cambridge, UK, 2010, 13 pgs.

O'Malley , et al., "Scalable Quantum Simulation of Molecular Energies", Phys. Rev. X 6, 031007, 2016, 13 pgs.

O'Malley , et al., "Scalable Quantum Simulation of Molecular Energies", arXiv:1512.06860v2 [quant-ph], Feb. 4, 2017, 13 pgs.

(56)          References Cited

OTHER PUBLICATIONS

Peruzzo, Alberto , et al., "A Variational Eigenvalue Solver on a Photonic Quantum Processor", Nature Communications, DOI: 10.1038/ncomms5213, Jul. 23, 2014, 7 pgs.

Peruzzo , et al., "A variational eigenvalue solver on a quantum processor", ArXiv:1304.3061v1 [quant-ph], Apr. 10, 2013, 10 pgs.

Peschel , et al., "Entanglement in Solvable Many-Particle Models", arXiv:1109.0159v1 [cond-mat.stat-mech], Sep. 1, 2011, 44 pgs.

* cited by examiner

400

900

910 — Provide Classial Data Set

920 — Run Quantum Autoencoder on QPU1 to Reduce Size of Data Set

930 — Load Reduced Data Set into Shared Classical Memory

940 — Run Quantum Machine Learning Algorithm on QPU2 for Processing the Reduced Data Set Uploaded from Shared Classical Memory

COMPUTING PLATFORM WITH HETEROGENOUS QUANTUM PROCESSORS

CROSS-REFERENCE TO RELATED APPLICATIONS

This application is a continuation of U.S. patent application Ser. No. 17/097,955, filed Nov. 13, 2020, which is a continuation of International Application PCT/US2019/033145, filed May 20, 2019, which claims priority to U.S. Provisional Application No. 62/673,658 filed May 18, 2018 and entitled "Computing Platform with Heterogenous Quantum Processors." The entire contents of the above-referenced priority applications, including all text and drawings, are hereby incorporated by reference.

BACKGROUND

The following description relates to computing platforms with heterogenous quantum processors.

Quantum computing is an emerging and fast-growing field that aims to harness quantum effects to perform information processing. There is a need for quantum computing systems with improved performance.

DETAILED DESCRIPTION

Figure 1:
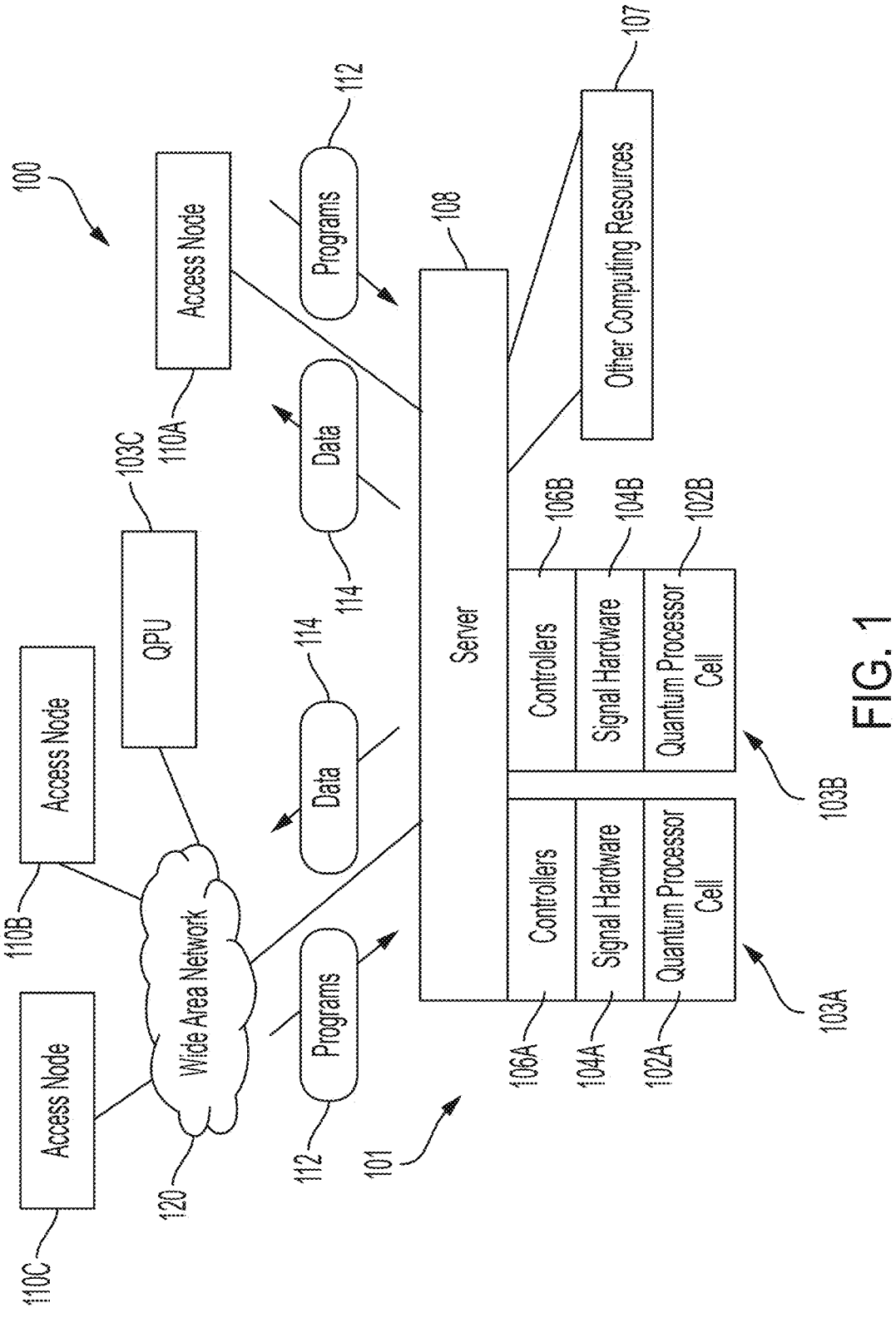
FIG. 1 shows an example quantum computer system, according to some embodiments.

In some aspects of what is described here, a hybrid quantum-classical computing platform may comprise: a multiplicity of QPUs, a shared classical memory, wherein the shared classical memory is configured to share data between each of the multiplicity of QPUs. In some embodiments, one or more of the multiplicity of QPUs operates at a higher repetition rate and/or clock rate than other ones of the multiplicity of QPUs; in some embodiments, one or more of the multiplicity of QPUs operates with a higher fidelity than other ones of the multiplicity of QPUs. In some embodiments, the first QPU is above the fault tolerant threshold for quantum error correction and the second QPU is below the fault tolerant threshold for quantum error correction; in some embodiments the fault tolerant threshold for quantum error correction is one percent gate infidelity for the surface code. These hybrid quantum-classical computing platforms may achieve higher performance than any one single component quantum processor—examples of applications are provided herein. The multiplicity of QPUs comprise one or more QPUs chosen from a nuclear spin QPU, an electron spin QPU, an ion trap QPU, a photonic QPU, a topological QPU, a superconducting circuit QPU, etc.

Herein the following terms are used and have the following meanings. Clock rate is the rate at which logic gates (i.e. instructions) are executed; note that this is a physical clock rate, for gates acting directly on physical qubits. Another term is logical clock rate which is understood herein to encompass several rounds of an error syndrome and correction cycle, for example. Repetition rate is the rate at which entire quantum circuits (programs) are executed. Repetition rates are relevant to certain quantum algorithms containing circuits whose output is non-deterministic, and thus several executions of the circuit must be completed to collect statistics on the distribution of outputs. For instance, an algorithm may need to sample several times from the output distribution. Gate speed is a synonym for the (physical) clock rate.

According to some embodiments, a method of operating a hybrid quantum-classical computing platform, may comprise: collecting a first set of data from a first QPU in a first classical local memory; transferring the first set of data from the first classical local memory to a shared classical memory; transferring the first set of data from the shared classical memory to a second classical local memory; and transferring the first set of data from the second classical local memory to a second QPU. In some embodiments, the first set of data is calibration data for the second QPU. In some embodiments, the first set of data is error syndrome data for the second QPU. In some embodiments, the first set of data is optimization data for a quantum approximate optimization algorithm (QAOA) iteration being run on the second QPU. In some embodiments, the first set of data is optimization data for a variational-quantum-eigensolver (VQE) algorithm iteration being run on the second QPU. In some embodiments, the first set of data is optimization data for a machine learning (ML) classification algorithm iteration being run on the second QPU. In some embodiments, the first set of data is a reduced data set derived from a classical data set autoencoded on the first QPU.

FIG. 1 is a block diagram of an example computing system 100. The example computing system 100 shown in FIG. 1 includes a computing environment 101 and access nodes 110A, 110B, 110C. A computing system may include additional or different features, and the components of a computing system may operate as described with respect to FIG. 1 or in another manner.

The example computing environment 101 includes computing resources and exposes their functionality to the access nodes 110A, 110B, 110C (referred to collectively as "access nodes 110"). The computing environment 101 shown in FIG. 1 includes a server 108, quantum processor units 103A, 103B and other computing resources 107. The computing environment 101 may also include one or more of the access nodes (e.g., the example access node 110A) and other features and components. A computing environment may include additional or different features, and the components of a computing environment may operate as described with respect to FIG. 1 or in another manner.

The example computing environment 101 can provide services to the access nodes 110, for example, as a cloud-based or remote-accessed computer, as a distributed computing resource, as a supercomputer or another type of high-performance computing resource, or in another manner. The computing environment 101 or the access nodes 110 may also have access to one or more remote QPUs (e.g., QPU 103C). As shown in FIG. 1, to access computing resources of the computing environment 101, the access nodes 110 send programs 112 to the server 108 and in response, the access nodes 110 receive data 114 from the server 108. The access nodes 110 may access services of the computing environment 101 in another manner, and the server 108 or other components of the computing environment 101 may expose computing resources in another manner.

Any of the access nodes 110 can operate local to, or remote from, the server 108 or other components of the computing environment 101. In the example shown in FIG. 1, the access node 110A has a local data connection to the server 108 and communicates directly with the server 108 through the local data connection. The local data connection can be implemented, for instance, as a wireless Local Area Network, an Ethernet connection, or another type of wired or wireless connection. Or in some cases, a local access node can be integrated with the server 108 or other components of the computing environment 101. Generally, the computing system 100 can include any number of local access nodes.

In the example shown in FIG. 1, the access nodes 110B, 110C and the QPU 103C each have a remote data connection to the server 108, and each communicates with the server 108 through the remote data connection. The remote data connection in FIG. 1 is provided by a wide area network 120, such as, for example, the Internet or another type of wide area communication network. In some cases, remote access nodes use another type of remote data connection (e.g., satellite-based connections, a cellular network, a private network, etc.) to access the server 108. Generally, the computing system 100 can include any number of remote access nodes.

The example server 108 shown in FIG. 1 communicates with the access nodes 110 and the computing resources in the computing environment 101. For example, the server 108 can delegate computational tasks to the quantum processor units 103A, 103B and the other computing resources 107, and the server 108 can receive the output data from the computational tasks performed by the quantum processor units 103A, 103B and the other computing resources 107. In some implementations, the server 108 includes a personal computing device, a computer cluster, one or more servers, databases, networks, or other types of classical or quantum computing equipment. The server 108 may include additional or different features, and may operate as described with respect to FIG. 1 or in another manner.

Each of the example quantum processor units 103A, 103B operates as a quantum computing resource in the computing environment 101. The other computing resources 107 may include additional quantum computing resources (e.g., quantum processor units, quantum virtual machines (QVMs) or quantum simulators) as well as classical (non-quantum) computing resources such as, for example, digital micro-processors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the server 108 generates computing jobs, identifies an appropriate computing resource (e.g., a QPU or QVM) in the computing environment 101 to execute the computing job, and sends the computing job to the identified resource for execution. For example, the server 108 may send a computing job to the quantum processor unit 103A, the quantum processor unit 103B or any of the other computing resources 107. A computing job can be formatted, for example, as a computer program, function, code or other type of computer instruction set. Each computing job includes instructions that, when executed by an appropriate computing resource, perform a computational task and generate output data based on input data. For example, a computing job can include instructions formatted for a quantum processor unit, a quantum virtual machine, a digital microprocessor, co-processor or other classical data processing apparatus, or another type of computing resource.

In some implementations, the server 108 operates as a host system for the computing environment 101. For example, the access nodes 110 may send programs 112 to server 108 for execution in the computing environment 101. The server 108 can store the programs 112 in a program queue, generate one or more computing jobs for executing the programs 112, generate a schedule for the computing jobs, allocate computing resources in the computing environment 101 according to the schedule, and delegate the computing jobs to the allocated computing resources. The server 108 can receive, from each computing resource, output data from the execution of each computing job. Based on the output data, the server 108 may generate additional computing jobs, generate data 114 that is provided back to an access node 110, or perform another type of action.

In some implementations, all or part of the computing environment 101 operates as a cloud-based quantum computing (QC) environment, and the server 108 operates as a host system for the cloud-based QC environment. For example, the programs 112 can be formatted as quantum computing programs for execution by one or more quantum processor units. The server 108 can allocate quantum computing resources (e.g., one or more QPUs, one or more quantum virtual machines, etc.) in the cloud-based QC environment according to the schedule, and delegate quantum computing jobs to the allocated quantum computing resources for execution.

In some implementations, all or part of the computing environment 101 operates as a hybrid computing environment, and the server 108 operates as a host system for the hybrid environment. For example, the programs 112 can be formatted as hybrid computing programs, which include instructions for execution by one or more quantum processor units and instructions that can be executed by another type of computing resource. The server 108 can allocate quantum computing resources (e.g., one or more QPUs, one or more quantum virtual machines, etc.) and other computing resources in the hybrid computing environment according to the schedule, and delegate computing jobs to the allocated computing resources for execution. The other (non-quantum) computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the server 108 can select the type of computing resource (e.g., quantum or otherwise) to execute an individual computing job in the computing environment 101. For example, the server 108 may select a particular quantum processor unit (QPU) or other computing resource based on availability of the resource, speed of the resource, information or state capacity of the resource, a performance metric (e.g., process fidelity) of the resource, or based on a combination of these and other factors. In some cases, the server 108 can perform load balancing, resource testing and calibration, and other types of operations to improve or optimize computing performance.

The example server 108 shown in FIG. 1 may include a quantum machine instruction library or other resources that the server 108 uses to produce quantum computing jobs to be executed by quantum computing resources in the computing environment 101 (e.g., by the quantum processor unit 103). The quantum machine instruction library may include, for example, calibration procedures, hardware tests, quantum algorithms, quantum gates, etc. The quantum machine instruction library can include a file structure, naming convention, or other system that allows the resources in the quantum machine instruction library to be invoked by the programs 112. For instance, the server 108 or the computing environment 101 can expose the quantum machine instruction library to the access nodes 110 through a set of application programming interfaces (APIs). Accordingly, the programs 112 that are produced by the access nodes 110 and delivered to the server 108 may include information that invokes a quantum machine instruction library stored at the server 108. In some implementations, one or more of the access nodes 110 includes a local version of a quantum machine instruction library. Accordingly, the programs 112 that are produced by the access node 110B and delivered to the server 108 may include instruction sets from a quantum machine instruction library.

Each of the example quantum processor units 103A, 103B shown in FIG. 1 can perform quantum computational tasks by executing quantum machine instructions. In some implementations, a quantum processor unit can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, a quantum processor unit (e.g., QPU 103A or QPU 103B) can operate using gate-based models for quantum computing. For example, the qubits can be initialized in an initial state, and a quantum logic circuit comprised of a series of quantum logic gates can be applied to transform the qubits and extract measurements representing the output of the quantum computation. In some implementations, a quantum processor unit (e.g., QPU 103A or QPU 103B) can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation, or other computational regimes may be used. Pairs of qubits can be addressed, for example, with two-qubit logic operations that are capable of generating entanglement, independent of other pairs of qubits. In some implementations, more than two qubits can be addressed, for example, with multi-qubit quantum logic operations capable of generating multi-qubit entanglement. In some implementations, the quantum processor unit 103A is constructed and operated according to a scalable quantum computing architecture. For example, in some cases, the architecture can be scaled to a large number of qubits to achieve large-scale general purpose coherent quantum computing.

The example quantum processor unit 103A shown in FIG. 1 includes controllers 106A, signal hardware 104A, and a quantum processor cell 102A; similarly the example quantum processor unit 103B shown in FIG. 1 includes controllers 106B, signal hardware 104B, and a quantum processor cell 102B. A quantum processor unit may include additional or different features, and the components of a quantum processor unit may operate as described with respect to FIG. 1 or in another manner.

In some instances, all or part of the quantum processor cell 102A functions as a quantum processor, a quantum memory, or another type of subsystem. In some examples, the quantum processor cell 102A includes a quantum circuit system. The quantum circuit system may include qubit devices, resonator devices and possibly other devices that are used to store and process quantum information. In some cases, the quantum processor cell 102A includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor cell 102A. In some cases, the quantum processor cell 102A includes an ion trap system, and the qubit devices are implemented as trapped ions controlled by optical signals delivered to the quantum processor cell 102A. In some cases, the quantum processor cell 102A includes a spin system, and the qubit devices are implemented as nuclear or electron spins controlled by microwave or radio-frequency signals delivered to the quantum processor cell 102A. The quantum processor cell 102A may be implemented based on another physical modality of quantum computing.

In some cases, a single quantum processor unit can include multiple quantum processor cells. For example, the QPU 103A can be a dual-QPU that includes multiple independent quantum processor cells in a shared environment. For instance, the dual-QPU may include two independently-operated superconducting quantum processor circuits in the same cryogenic environment, on the same chip or substrate, or in another type of shared circuit environment. In some cases, the QPU 103A includes two, three, four or more quantum processor cells that can operate in parallel based on interactions with the controllers 106A.

In some implementations, the example quantum processor cell 102A can process quantum information by applying control signals to the qubits in the quantum processor cell 102A. The control signals can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

The example signal hardware 104A includes components that communicate with the quantum processor cell 102A. The signal hardware 104A may include, for example, waveform generators, amplifiers, digitizers, high-frequency sources, DC sources, AC sources and other type of components. The signal hardware may include additional or different features and components. In the example shown, components of the signal hardware 104A are adapted to interact with the quantum processor cell 102A. For example, the signal hardware 104A can be configured to operate in a particular frequency range, configured to generate and process signals in a particular format, or the hardware may be adapted in another manner.

In some instances, one or more components of the signal hardware 104A generate control signals, for example, based on control information from the controllers 106A. The control signals can be delivered to the quantum processor cell 102A to operate the quantum processor unit 103A. For instance, the signal hardware 104A may generate signals to implement quantum logic operations, readout operations or other types of operations. As an example, the signal hardware 104A may include arbitrary waveform generators (AWGs) that generate electromagnetic waveforms (e.g., microwave or radio-frequency) or laser systems that generate optical waveforms. The waveforms or other types of signals generated by the signal hardware 104A can be delivered to devices in the quantum processor cell 102A to operate qubit devices, readout devices, bias devices, coupler devices or other types of components in the quantum processor cell 102A.

In some instances, the signal hardware 104A receives and processes signals from the quantum processor cell 102A. The received signals can be generated by operation of the quantum processor unit 103A. For instance, the signal hardware 104A may receive signals from the devices in the quantum processor cell 102A in response to readout or other operations performed by the quantum processor cell 102A. Signals received from the quantum processor cell 102A can be mixed, digitized, filtered, or otherwise processed by the signal hardware 104A to extract information, and the information extracted can be provided to the controllers 106A or handled in another manner. In some examples, the signal hardware 104A may include a digitizer that digitizes electromagnetic waveforms (e.g., microwave or radio-frequency) or optical signals, and a digitized waveform can be delivered to the controllers 106A or to other signal hardware components. In some instances, the controllers 106A process the information from the signal hardware 104A and provide feedback to the signal hardware 104A; based on the feedback, the signal hardware 104A can in turn generate new control signals that are delivered to the quantum processor cell 102A.

In some implementations, the signal hardware 104A includes signal delivery hardware that interface with the quantum processor cell 102A. For example, the signal hardware 104A may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processor cell 102A. In some instances, signal delivery hardware performs preprocessing, signal conditioning or other operations on readout signals received from the quantum processor cell 102A.

The example controllers 106A communicate with the signal hardware 104A to control operation of the quantum processor unit 103A. The controllers 106A may include digital computing hardware that directly interface with components of the signal hardware 104A. The example controllers 106A may include processors, memory, clocks and other types of systems or subsystems. The processors may include one or more single- or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory, a digital or quantum memory, or another type of computer storage medium. The controllers 106A may include additional or different features and components.

In some implementations, the controllers 106A include memory or other components that store quantum state information, for example, based on qubit readout operations performed by the quantum processor unit 103A. For instance, the states of one or more qubits in the quantum processor cell 102A can be measured by qubit readout operations, and the measured state information can be stored in a cache or other type of memory system in or more of the controllers 106A. In some cases, the measured state information is used in the execution of a quantum algorithm, a quantum error correction procedure, a quantum processor unit (QPU) calibration or testing procedure, or another type of quantum process.

In some implementations, the controllers 106A include memory or other components that store quantum machine instructions, for example, representing a quantum program for execution by the quantum processor unit 103A. In some cases, the quantum machine instructions are received from the server 108 in a hardware-independent format. For example, quantum machine instructions may be provided in a quantum instruction language such as Quil, described in the publication "A Practical Quantum Instruction Set Architecture," arXiv:1608.03355v2, dated Feb. 17, 2017, or another quantum instruction language. For instance, the quantum machine instructions may be written in a format that can be executed by a broad range of quantum processor units or quantum virtual machines.

In some instances, the controllers 106A can interpret the quantum machine instructions and generate a hardware-specific control sequences configured to execute the operations proscribed by the quantum machine instructions. For example, the controllers 106A may generate control information that is delivered to the signal hardware 104A and converted to control signals that control the quantum processor cell 102A.

In some implementations, the controllers 106A include one or more clocks that control the timing of operations. For example, operations performed by the controllers 106A may be scheduled for execution over a series of clock cycles, and clock signals from one or more clocks can be used to control the relative timing of each operation or groups of operations. In some cases, the controllers 106A schedule control operations according to quantum machine instructions in a quantum computing program, and the control information is delivered to the signal hardware 104A according to the schedule in response to clock signals from a clock or other timing system.

In some implementations, the controllers 106A include processors or other components that execute computer program instructions (e.g., instructions formatted as software, firmware, or otherwise). For example, the controllers 106A may execute a quantum processor unit (QPU) driver software, which may include machine code compiled from any type of programming language (e.g., Python, C++, etc.) or instructions in another format. In some cases, QPU driver software receives quantum machine instructions (e.g., based on information from the server 108) and quantum state information (e.g., based on information from the signal hardware 104A), and generates control sequences for the quantum processor unit 103A based on the quantum machine instructions and quantum state information.

In some instances, the controllers 106A generate control information (e.g., a digital waveform) that is delivered to the signal hardware 104A and converted to control signals (e.g., analog waveforms) for delivery to the quantum processor cell 102A. The digital control information can be generated based on quantum machine instructions, for example, to execute quantum logic operations, readout operations, or other types of control.

In some instances, the controllers 106A extract qubit state information from qubit readout signals, for example, to identify the quantum states of qubits in the quantum processor cell 102A or for other purposes. For example, the controllers may receive the qubit readout signals (e.g., in the form of analog waveforms) from the signal hardware 104A, digitize the qubit readout signals, and extract qubit state information from the digitized signals.

The other QPU 103B and its components (e.g., the quantum processor cell 102B, the signal hardware 104B and controllers 106B) can be implemented, and in some instances operate, as described above with respect to the QPU 103A; in some cases, the QPU 103B and its components may be implemented or may operate in another manner. Similarly, the remote QPU 103C and its components can be implemented, and in some instances operate, in analogous manner.

Figure 2:
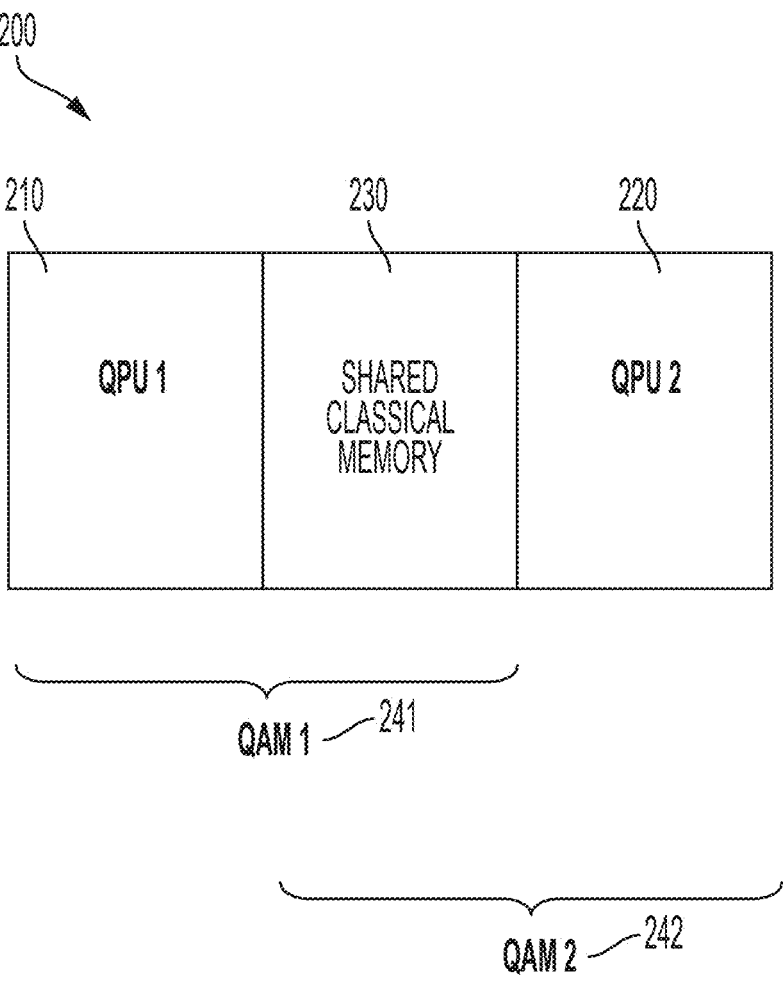
FIG. 2 shows a schematic representation of a computing platform with heterogenous quantum processors and a shared classical memory, according to a first embodiment.
Figure 3:
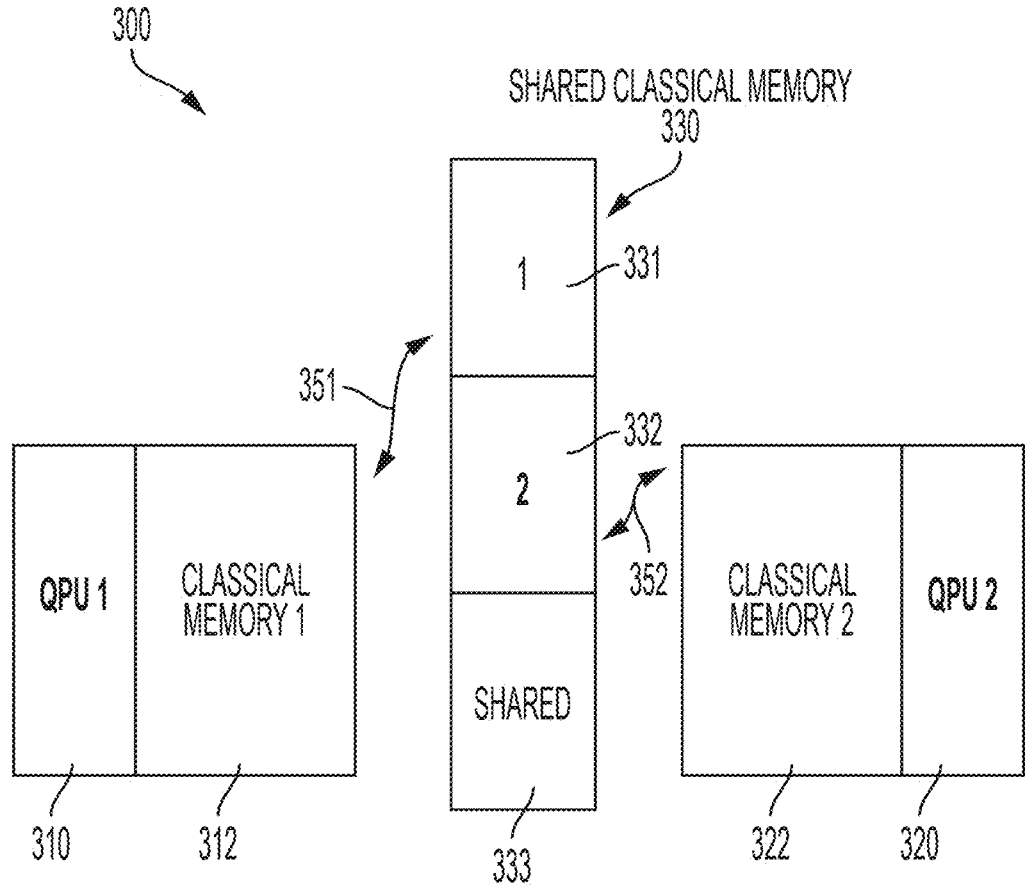
FIG. 3 shows a schematic representation of a computing platform with heterogenous quantum processors and a shared classical memory, according to a second embodiment.
Figure 4:
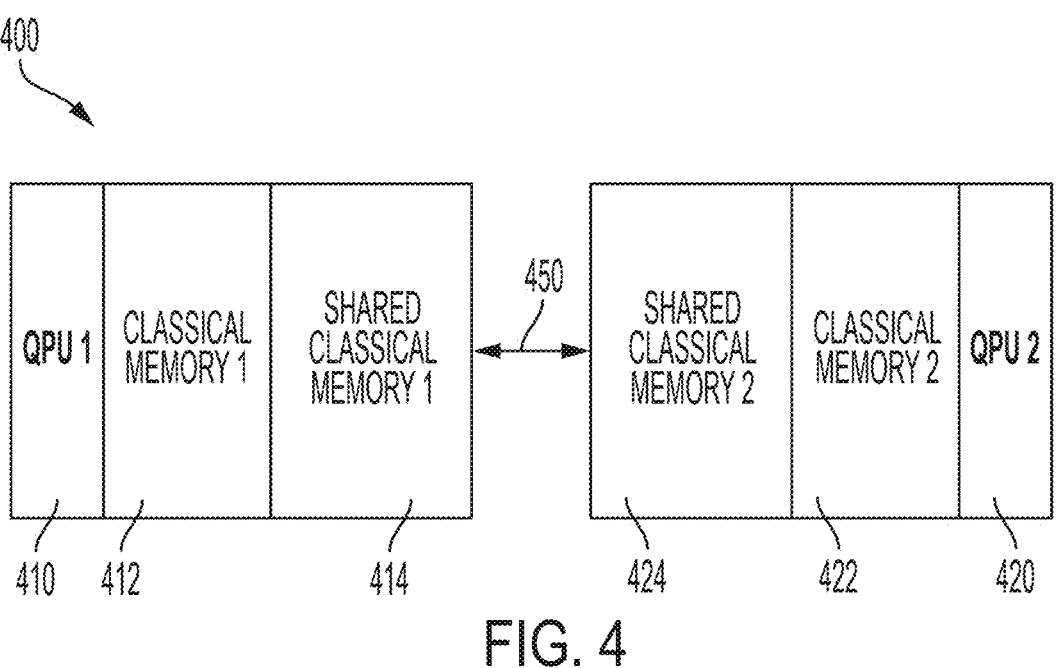
FIG. 4 shows a schematic representation of a computing platform with heterogenous quantum processors and a shared classical memory, according to a third embodiment.

FIGS. 2-4 show different configurations of a computing platform with heterogenous quantum processor units (QPUs) and a shared classical memory. Each of FIGS. 2-4 may be part of a computing system such as described with reference to FIG. 1 above.

In FIG. 2 the computing platform 200 comprises two QPUs (QPU 1 210 and QPU 2 220) sharing a single classical memory 230—in effect they are two quantum abstract machines (QAM 1 241 and QAM 2 242) using the same classical memory 230. (A quantum abstract machine, QAM, is an abstract representation of a general-purpose quantum computing device, including support for manipulating both classical and quantum states.)

In FIG. 3. the computing platform 300 comprises two QPUs (QPU 1 310 and QPU 2 320) where each QPU has its own classical memory (classical memory 1 312 and classical memory 2 322), and data is copied from these classical memories to a shared memory 330, which in some embodiments is partitioned into three sections, section 331 for copies of data from QPU1, section 332 for data from QPU 2, and section 333 for data shared with both QPU1 and QPU2. The computing platform may be controlled from one of QPU 1, QPU 2, or the shared memory. The two QPUs and the shared memory may be all co-located, all physically separated, even by large distances in some instances, or two of the three may be co-located (where one of the three is physically separate, even by large distances in some instances).

In FIG. 4 the computing platform 400 comprises two QPUs (QPU 1 410 and QPU 2 420) where each QPU has its own classical memory (classical memory 1 412 and classical memory 2 422) and the shared classical memory is physically divided between the two QPUs (shared classical memory 1 414 and shared classical memory 2 424). A communication link 450 between the two halves of the shared memory allows for the two parts of the shared classical memory to be regularly updated so as to have nominally identical data available on both parts. The embodiment of FIG. 4 may have one of the two QPUs acting as a head node (e.g. at least controlling the interface between the two QPUs). The embodiment of FIG. 4 may have the two QPUs either co-located or physically separated, even by large distances in some instances.

Figure 5:
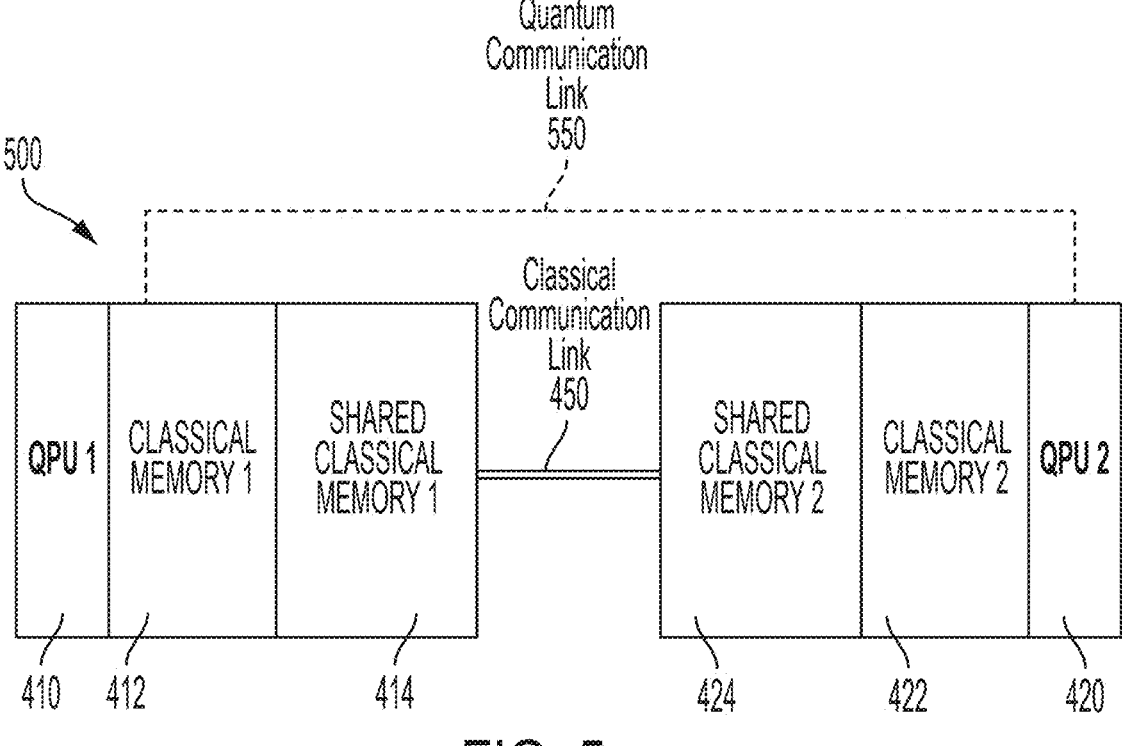
FIG. 5 shows a schematic representation of a computing platform with heterogenous quantum processors and a shared classical memory, according to a fourth embodiment.

FIG. 5 shows a computing platform 500 which is the embodiment of FIG. 4 with a classical communication link 450 between the two parts of the shared memory, and a quantum communication link 550 between the two QPUs to enable teleportation. An example of a quantum communication link is an optical link through fiber networks; such a link works natively with ion trap QPUs, although for superconducting circuit QPUs a microwave to optical transducer is needed.

Figure 6:
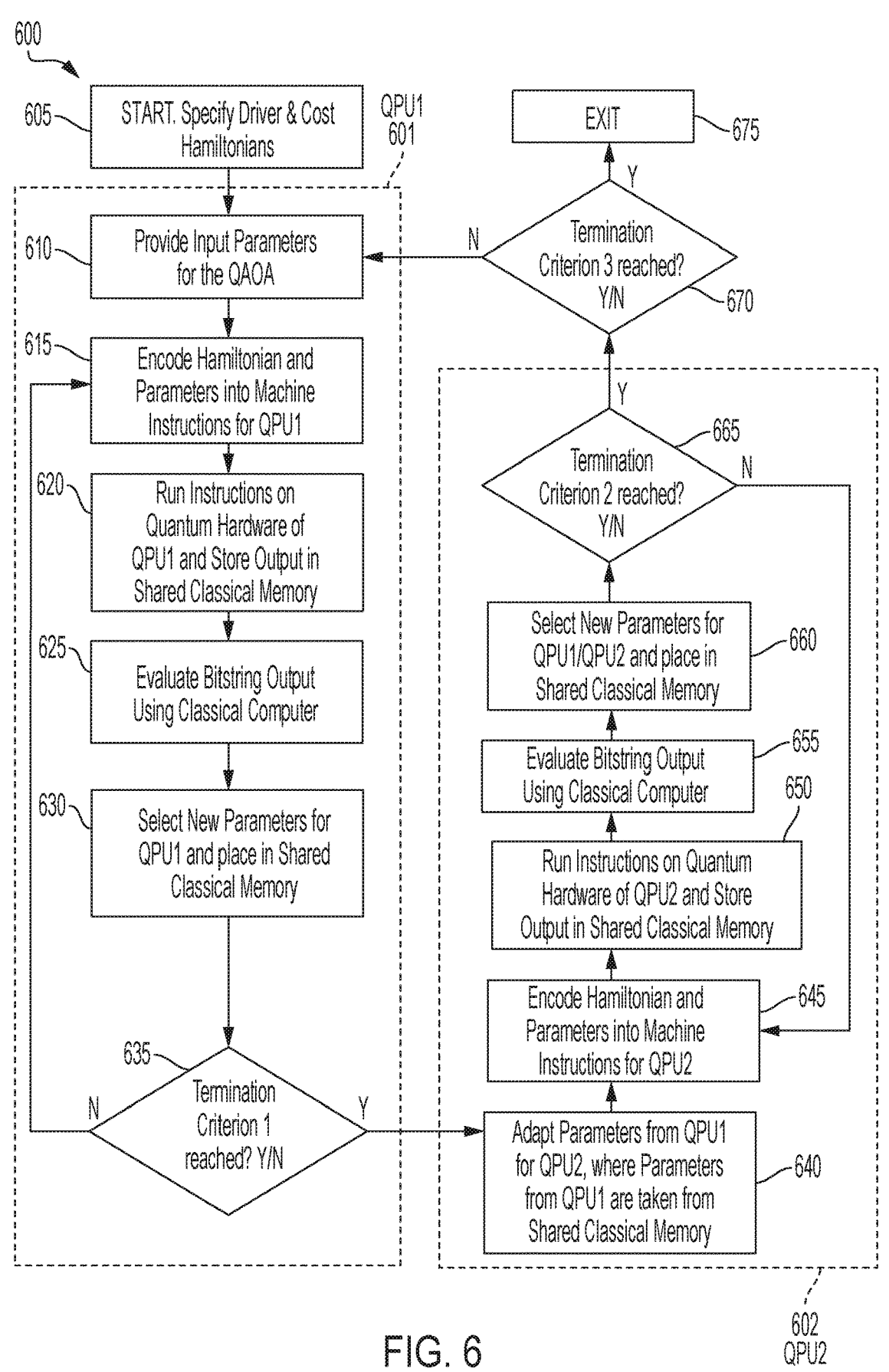
FIG. 6 shows a flow diagram for running an optimized QAOA on a computing platform with heterogenous quantum processors, according to some embodiments.

FIG. 6 shows a flow diagram 600 for running an optimized quantum approximate optimization algorithm (QAOA) on a computing platform with heterogenous quantum processors QPU1 601 and QPU2 602, such as described above. According to some embodiments, a faster QPU1 is used to do "look aheads" in the optimization for QAOA that will adjust the parameters for the QPU2 QAOA and make it converge faster and/or better. For example, the first QPU may operate at a repetition rate and/or clock rate approximately a factor of 102 higher than the second QPU. According to some embodiments, a method of using a first QPU to optimize a QAOA running on a second QPU on a hybrid quantum-classical computing platform may comprise: specifying driver and cost Hamiltonians (605); providing input parameters for a first execution of a QAOA (610); encoding Hamiltonian and input parameters into machine instructions for the first QPU (615); running instructions on quantum hardware of the first QPU and storing the output in shared classical memory (620); evaluating bitstring output using a first classical computer (625); selecting new input parameters for the first QPU and storing the new input parameters in shared classical memory (630); repeating the encoding, running, evaluating and selecting until a first termination criterion is reached (635); after reaching the first termination criterion, adapting parameters from the first QPU for the second QPU, where parameters from the first QPU are taken from the shared classical memory (640); encoding Hamiltonian and new input parameters into machine instructions for the second QPU (645); running instructions on quantum hardware of second QPU and storing output in shared classical memory (650); evaluating bitstring output using a second classical computer (655); selecting new input parameters for the first QPU and storing the new input parameters in shared classical memory (660); repeating the encoding, running, evaluating and selecting until a second termination criterion is reached (665); and evaluating whether a third termination criterion is reached (670) and if termination criterion is reached exiting program (675) and if criterion is not reached providing new input parameters to the first QPU (returning to step 610); wherein the first QPU operates at a higher repetition rate and/or clock rate than the second QPU and the second QPU operates with a higher fidelity than the first QPU. Herein the 3 termination criteria are used to optimize the process running on the two QPUs and determine how many repetitions to perform on the first QPU, the second QPU and the combined system. Note that in some embodiments QPU1 may be utilized to explore parameter space and increase confidence that the process is not simply finding a local minimum rather than an overall minimum, and thus improving the optimization process.

Figure 7:
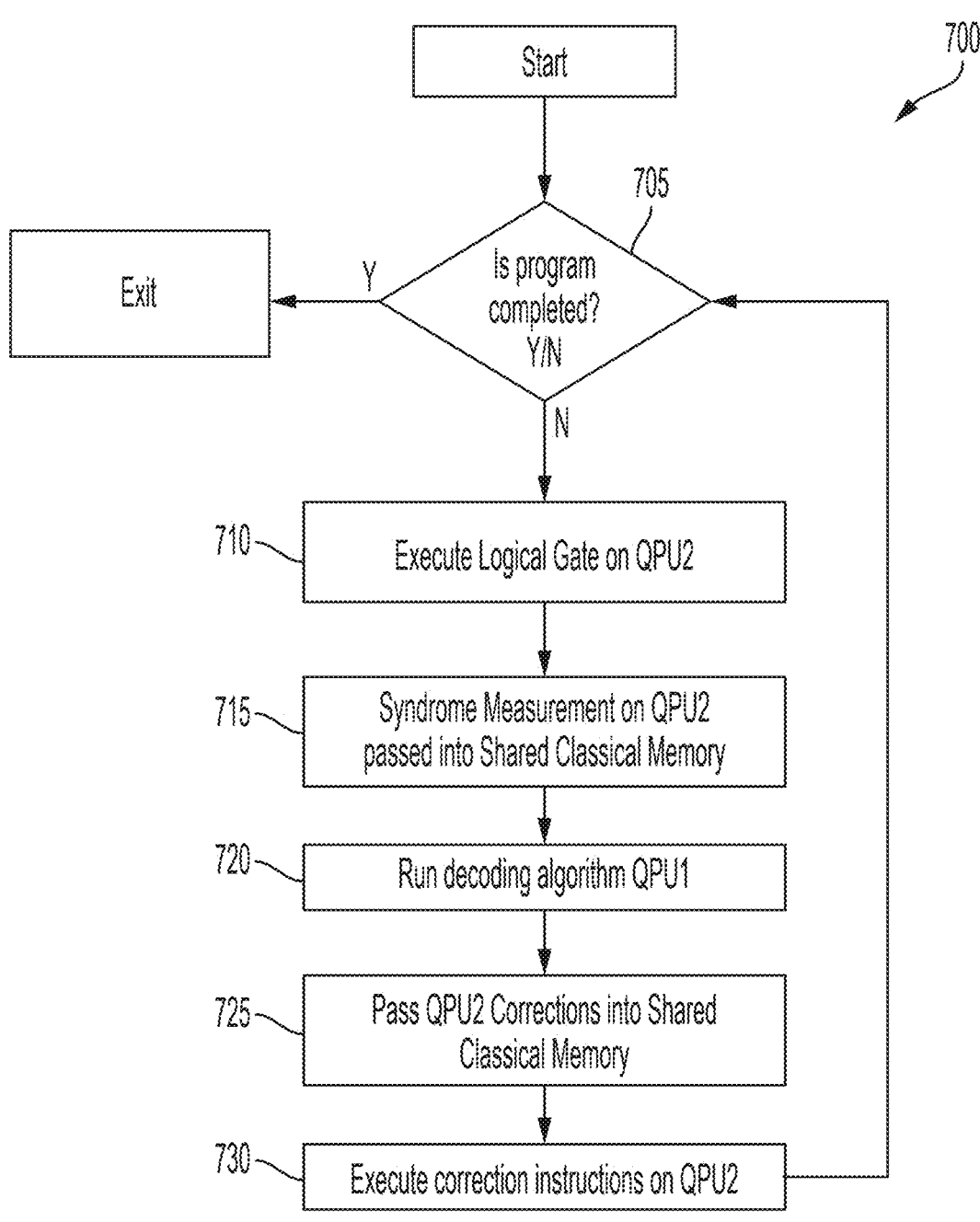
FIG. 7 shows a flow diagram for running error correction on a computing platform with heterogenous quantum processors, according to some embodiments.

FIG. 7 shows a flow diagram 700 for running error correction on a computing platform with heterogenous quantum processors, according to some embodiments. Error correction of QPU2 by QPU1 is shown, where QPU1 is used to run a decoder that assists in decoding syndromes from QPU2. According to some embodiments, a method of error correction by a first QPU of a second QPU on a hybrid quantum-classical computing platform with a shared classical memory may comprise: executing a logical gate on the second QPU (710); measuring an error syndrome on the second QPU and recording the syndrome measurement in the shared classical memory (715); running a decoding algorithm for the syndrome measurement on the first QPU (720), where the first QPU accesses the syndrome measurement in the shared classical memory; recording corrections obtained from the running step in the shared classical memory (725); and executing corrections instructions derived from the corrections stored in the shared classical memory on the second QPU (730); wherein the first QPU operates at a higher repetition rate and/or clock rate than the second QPU. For example, the first QPU operates at a repetition rate and/or clock rate approximately a factor of $10^3$ higher than the second QPU. (Note that the error correction must run significantly faster than the coherence time for the system being error corrected, for the method to be useful.) This process may be repeated for each logical gate in a program until the program is complete (705)—the executing a logical gate, measuring, running, recording and executing corrections instructions steps being repeated for each logical gate in a quantum program until the program has been completed.

Examples of QPU1 decoding algorithms could be as follows: Markov Chain Monte Carlo simulations with parallel tempering run as quantum algorithm versions of the following methods, incorporated herein by reference: https://www.nature.com/articles/ncomms12302; https://journals.aps.org/pra/abstract/10.1103/PhysRevA.89.022326; simulating the execution of the QPU2 program on QPU1 and running a subset of tomography to characterize the noise. Optionally, different decoding algorithms could be run on simulated syndromes instead of tomography.

Figure 8A:
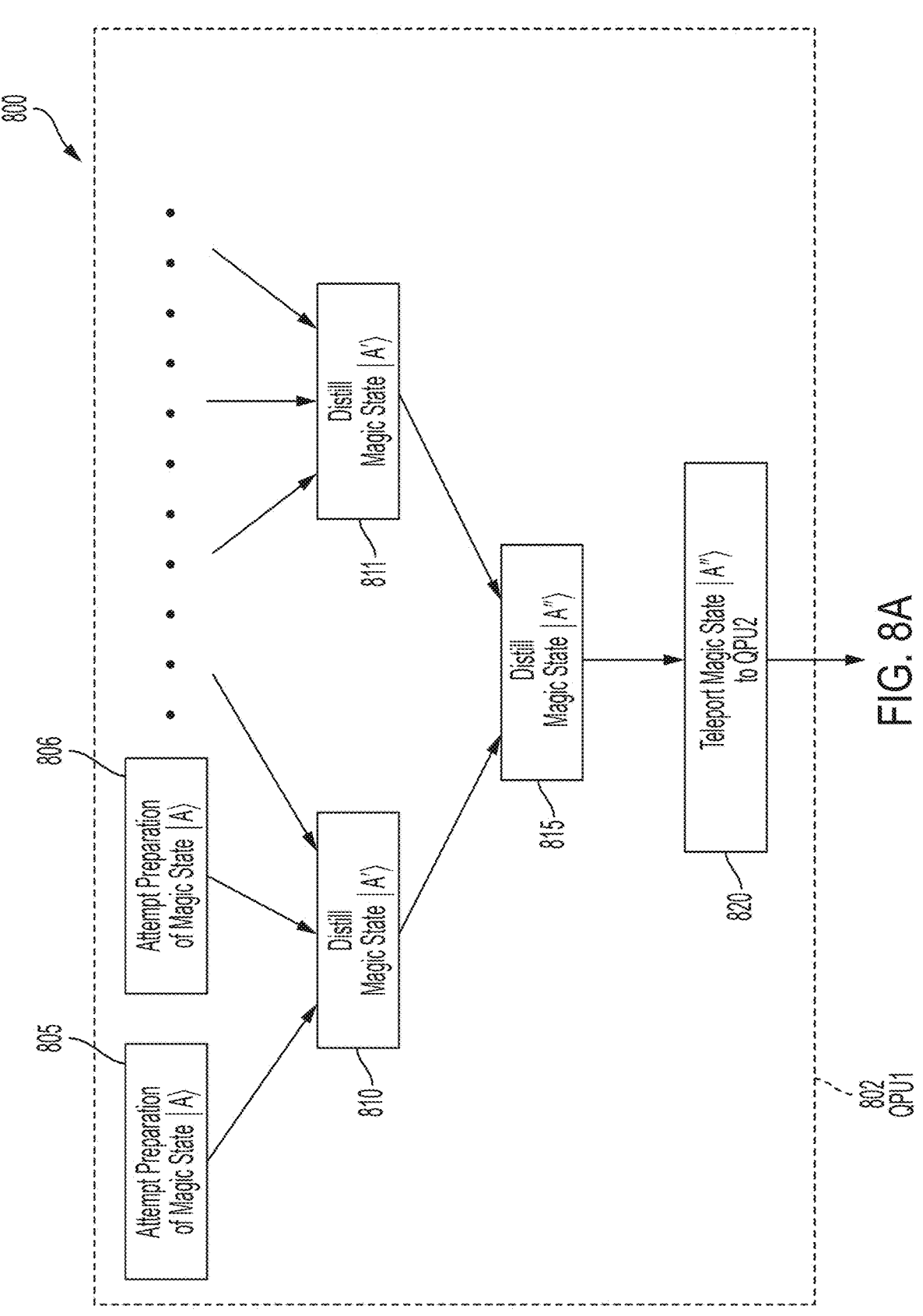
FIGS. 8A & 8B show a flow diagram for increasing the effective clock rate of an error-corrected quantum processor on a computing platform with heterogenous quantum processors, according to some embodiments.
Figure 8B:
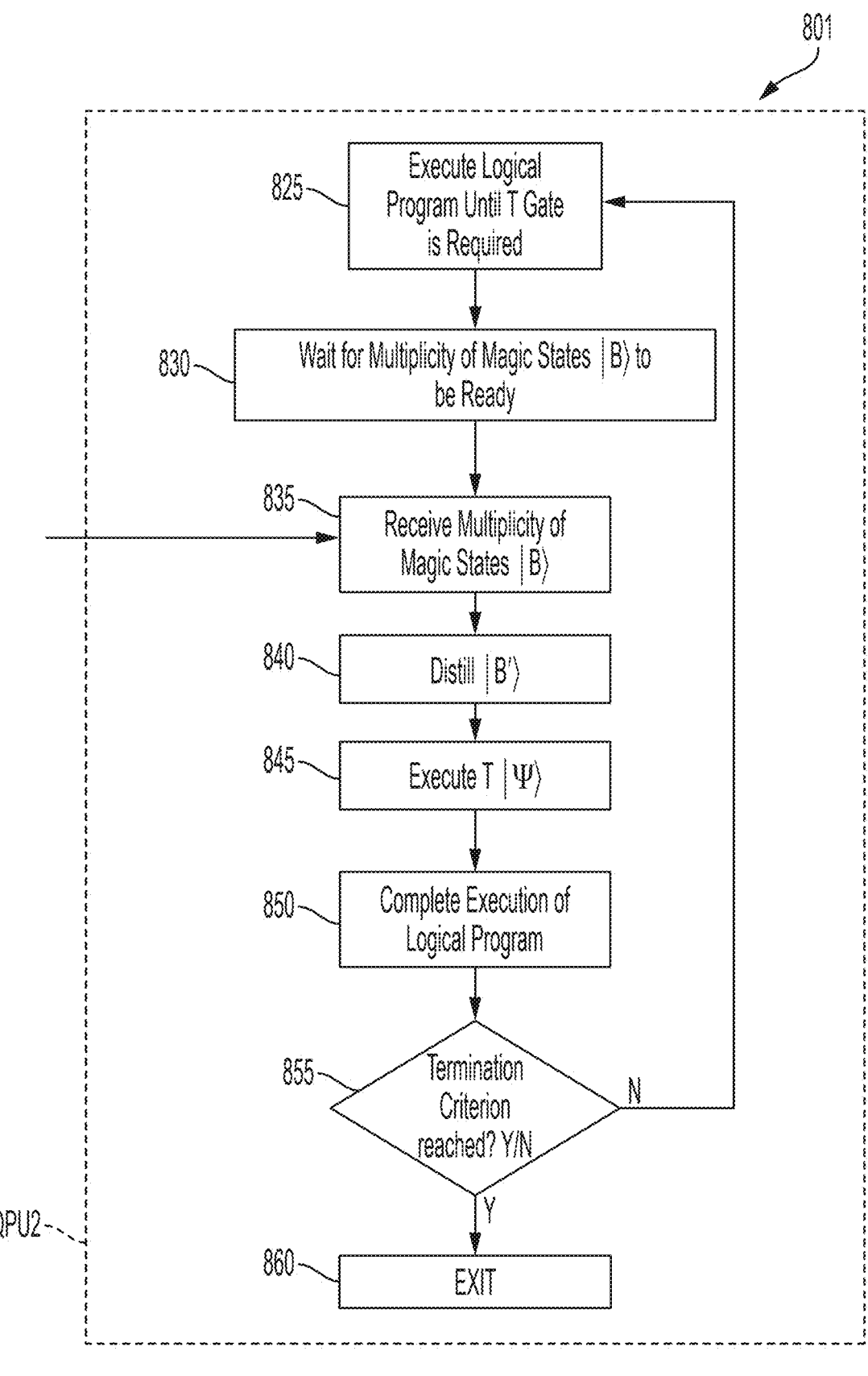

FIGS. 8A & 8B show a flow diagram 800 and 801 for increasing the effective clock rate of an error-corrected quantum processor on a computing platform with heterogenous quantum processors. According to some embodiments, a method for increasing the effective clock rate of an error-corrected QPU on a hybrid quantum-classical computing platform may comprise: providing a first QPU 802; executing a logical program on a second QPU 803 until a T gate is required (825); when the T gate is required, stopping executing and waiting until a multiplicity of magic states are available (830); receiving at the second QPU from the first QPU by teleportation the multiplicity of magic states (835);

distillation of the multiplicity of magic states on the second QPU (840); continuing execution of the logical program with the T gate (845); and repeating execution of the logical program until a termination criterion is reached 855; wherein the first QPU, to generate and teleport the multiplicity of magic states, repeats a process comprising: attempting preparation of a plurality of magic states on the first QPU (805, 806); distilling the plurality of magic states on the first QPU to a single magic state (810, 811); and teleporting the single magic state from the first QPU to the second QPU (820); wherein the first QPU operates at a higher clock rate than the second QPU. Furthermore, the first QPU may operate at a clock rate at least 10 times faster than the clock rate of the second QPU and the rate of teleportation of magic states may be greater than the clock rate of the second QPU multiplied by a number of cycles of the first QPU needed to generate and teleport the multiplicity of magic states from the first QPU to the second QPU.

One of the foundational ideas in fault-tolerant quantum computation comes from Bravyi and Kitaev (S. Bravyi and A. Kitaev, Phys. Rev. A 71, 022316 (2005)), who showed how to deal with a limitation common to many error correcting codes—namely, that most such codes do not directly support a logical gate set that is sufficient for universal quantum computation (QC). Many error correcting codes allow for Clifford group operations, but universal QC requires at least one operation outside of the Clifford group. To restore universal QC in the presence of error correction, one may perform non-Clifford operations via teleportation with special resource states. See D. Gottesman and I. Chuang, Nature 402, 390 (1999). However, in order for these teleported gates to not introduce too many errors, we also require a means to fault-tolerantly prepare pure resource states.

Magic state distillation is a method that allows for distillation of a pure resource state from several copies of approximate versions of the same. The idea is that in certain error correcting codes (e.g. the 5-qubit code), the encoded form of a logical magic state is equivalent to the tensor product of magic states in the constituent physical qubits. Consequently, if the decoder circuit for such an input state flags no errors, then the resulting state after execution of the decoder is a higher-fidelity encoded magic state.

Each round of such a distillation protocol suppresses errors in the input states. Consequently, in practice one may need to use several rounds of distillation to reach a target error rate. On a QPU with a slow clock rate, this distillation protocol is likely to dominate the total execution time of any algorithm running on an error corrected QC. Consequently, the method described herein would accelerate magic state distillation by offloading several rounds of distillation to a faster QPU, so that a slower, higher-fidelity QPU would require fewer distillation rounds to reach a desired error rate.

Figure 9:
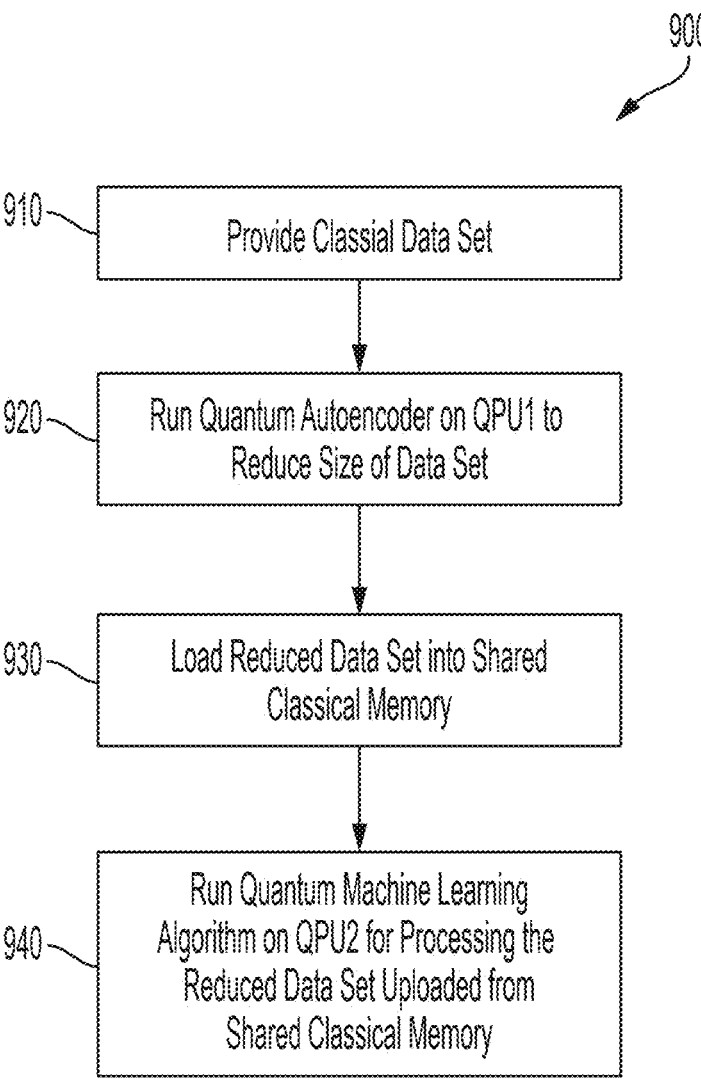
FIG. 9 shows a flow diagram for running model reduction on a computing platform with heterogenous quantum processors, according to some embodiments.

FIG. 9 shows a flow diagram 900 for running model reduction on a computing platform with heterogenous quantum processors, using QPU1 as a preprocessor or filter for QPU2, according to some embodiments. According to some embodiments, a method for model reduction using a first QPU as a preprocessor for a second QPU on a hybrid quantum-classical computing platform may comprise: providing a classical data set (910); running a quantum autoencoder on the first QPU for reducing the size of the classical data set (920); loading the reduced classical data set into a shared classical memory (930); and running a quantum machine learning algorithm on the reduced classical data set on the second QPU (940); wherein the first QPU operates at a higher repetition rate and/or clock rate than the second QPU and the second QPU operates with a higher
fidelity than the first QPU. Furthermore, according to some
embodiments a Quantum Boltzmann Machine on the first
QPU may be used as an autoencoder to generate lower
dimensional input features for the second QPU. See M.
Amin et al, Phys. Rev. X 8, 021050 (2018) for an example
of a Quantum Boltzmann Machine.

Furthermore, in some embodiments model reduction may
comprise running a quantum autoencoder on a third QPU for
further reducing the size of the reduced classical data set
before the running the quantum machine learning algorithm,
wherein the third QPU operates at a higher repetition rate
and/or clock rate than the second QPU and the second QPU
operates with a higher fidelity than the third QPU, and
wherein the first QPU operates at a higher repetition rate
and/or clock rate than the third QPU and the third QPU
operates with a higher fidelity than the first QPU.

Figure 10:
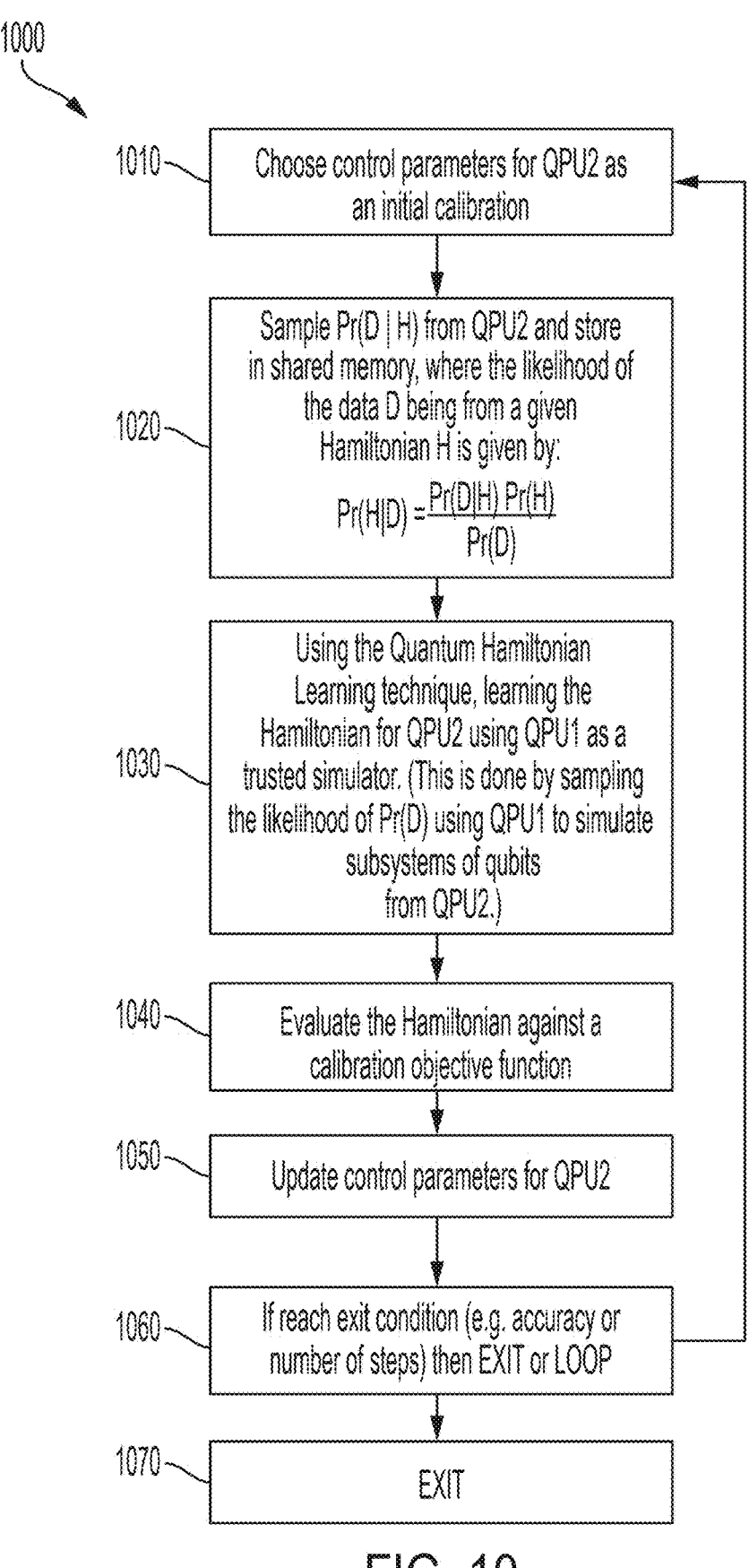
FIG. 10 shows a flow diagram for running calibration on a computing platform with heterogenous quantum processors, according to some embodiments.

FIG. 10 shows a flow diagram 1000 for running calibra-
tion on a computing platform with heterogenous quantum
processors, according to some embodiments. An example
learning method is to use Bayes rule to evaluate the likeli-
hood of the data D being from by a given Hamiltonian H:

$$Pr(H \mid D) = \frac{Pr(D \mid H) Pr(H)}{Pr(D)};$$

Assume that QPU2 has more qubits than QPU1 without loss
of generality. We use QPU1 as a trusted simulator in the
Quantum Hamiltonian Learning of QPU2. See https://
arxiv.org/pdf/1311.5269.pdf, incorporated by reference
herein, for an example of a suitable Quantum Hamiltonian
Learning algorithm. We can use this for calibration as long
as we have defined some objective function for the Hamil-
tonian that we want and a distance metric for the current
Hamiltonian that describes how far we are from the target.
This distance then becomes a calibration objective function.
Note that the calibration objective function may be the
average distance a set of random sequences is from the
identity, as used in randomized benchmarking. For example,
see Magesan et al, PRL 106, 180504 (2011). Furthermore, in
some embodiments a richer tomography protocol may be
used to compare distance to other maps, for example, as
shown by Kimmel et al, Phys. Rev. X 4, 011050 (2014),
incorporated herein by reference.

According to some embodiments, a method of using a first
QPU for calibrating a second QPU on a hybrid quantum-
classical computing platform may comprise: choosing con-
trol parameters for the second QPU as an initial calibration
(1010); sampling Pr(D|H) from the second QPU and storing
the sampled data in shared classical memory (1020),
wherein the likelihood of the data D being from a given
Hamiltonian H is given by $$Pr(H \mid D) = \frac{Pr(D \mid H) Pr(H)}{Pr(D)};$$

using the Quantum Hamiltonian Learning technique, learn-
ing the Hamiltonian for the second QPU using the first QPU
as a trusted simulator (1030); evaluating the Hamiltonian
against a calibration objective function (1040); and updating
control parameters for the second QPU (1050); wherein the
first QPU operates at a higher repetition rate and/or clock
rate than the second QPU and the second QPU operates with
a higher fidelity than the first QPU. The calibration method may be repeated until a termination criterion is reached
(1060)—when termination criteria is reached the program is
exited (1070).

While this specification contains many details, these
should not be understood as limitations on the scope of what
may be claimed, but rather as descriptions of features
specific to particular examples. Certain features that are
described in this specification or shown in the drawings in
the context of separate implementations can also be com-
bined. Conversely, various features that are described or
shown in the context of a single implementation can also be
implemented in multiple embodiments separately or in any
suitable sub-combination.

Similarly, while operations are depicted in the drawings in
a particular order, this should not be understood as requiring
that such operations be performed in the particular order
shown or in sequential order, or that all illustrated operations
be performed, to achieve desirable results. In certain cir-
cumstances, multitasking and parallel processing may be
advantageous. Moreover, the separation of various system
components in the implementations described above should
not be understood as requiring such separation in all imple-
mentations, and it should be understood that the described
program components and systems can generally be inte-
grated together in a single product or packaged into multiple
products.

A number of embodiments have been described. Never-
theless, it will be understood that various modifications can
be made. Accordingly, other embodiments are within the
scope of the following claims.

What is claimed is:

1. A method of using a first quantum processor unit (QPU)
to calibrate a second QPU in a hybrid quantum-classical
computing platform, the method comprising:
obtaining control parameters for the second QPU as an
initial calibration;
generating sampled data based on operating the second
QPU with the control parameters;
storing the sampled data in shared classical memory;
using the sampled data in a quantum Hamiltonian learning
process, wherein the quantum Hamiltonian learning
process produces a learned Hamiltonian of the second
QPU based on operating the first QPU as a trusted
simulator; and
updating the control parameters for the second QPU based
on evaluating the learned Hamiltonian against a cali-
bration objective function.

2. The method of claim 1, wherein the quantum Hamil-
tonian learning process uses the first QPU to simulate
subsystems of qubits of the second QPU.

3. The method of claim 1, further comprising performing
an iterative process until a termination criterion is reached,
each iteration of the iterative process comprising:
generating sampled data for the iteration based on oper-
ating the second QPU with the updated control param-
eters;
storing the sampled data for the iteration in the shared
classical memory;
using the sampled data for the iteration in the quantum
Hamiltonian learning process, wherein the quantum
Hamiltonian learning process produces a learned Ham-
iltonian for the iteration; and
updating the control parameters based on evaluating the
learned Hamiltonian for the iteration against the cali-
bration objective function.

4. The method of claim 3, wherein the termination crite-
rion is a target calibration accuracy.

5. The method of claim 1, wherein the calibration objective function is the average distance from a set of random sequences to the identity.

6. The method of claim 1, wherein the first QPU operates at a higher clock rate than the second QPU.

7. The method of claim 1, wherein the first QPU operates at a higher logical clock rate than the second QPU.

8. The method of claim 1, wherein the first QPU operates at a higher repetition rate than the second QPU.

9. The method of claim 1, wherein the second QPU has higher fidelity than the first QPU.

10. The method of claim 1, wherein the shared classical memory is connected to both the first QPU and the second QPU, and the shared classical memory is configured to share data between the first QPU and the second QPU.

11. The method of claim 1, wherein the first QPU comprises a first classical local memory, the second QPU comprises a second classical local memory, and the first classical local memory and the second classical local memory are connected to the shared classical memory for transferring data between the first QPU and the second QPU.

12. The method of claim 1, wherein the hybrid quantum-classical computing platform comprises a quantum communication link between the first QPU and the second QPU for teleportation of quantum states.

13. The method of claim 1, wherein generating the sampled data comprises sampling Pr(D|H), wherein a likelihood of the data D being from a given Hamiltonian H is given by $$Pr(H \mid D) = \frac{Pr(D \mid H) Pr(H)}{Pr(D)}.$$

14. A hybrid quantum-classical computing platform comprising:
  a first quantum processor unit (QPU);
  a second QPU;
  shared classical memory; and
  a classical computing resource configured to:
    obtain control parameters for the second QPU as an initial calibration;

generate sampled data based on operating the second QPU with the control parameters;
    store the sampled data in the shared classical memory;
    use the sampled data in a quantum Hamiltonian learning process, wherein the quantum Hamiltonian learning process produces a learned Hamiltonian of the second QPU based on operating the first QPU as a trusted simulator; and
    update the control parameters for the second QPU based on evaluating the learned Hamiltonian against a calibration objective function.

15. The platform of claim 14, wherein the quantum Hamiltonian learning process uses the first QPU to simulate subsystems of qubits of the second QPU.

16. The platform of claim 14, wherein the classical computing resource is configured to perform an iterative process until a termination criterion is reached, each iteration of the iterative process comprising:
  generating sampled data for the iteration based on operating the second QPU with the updated control parameters;
  storing the sampled data for the iteration in the shared classical memory;
  using the sampled data for the iteration in the quantum Hamiltonian learning process, wherein the quantum Hamiltonian learning process produces a learned Hamiltonian for the iteration; and
  updating the control parameters based on evaluating the learned Hamiltonian for the iteration against the calibration objective function.

17. The platform of claim 14, wherein the termination criterion is a target calibration accuracy.

18. The platform of claim 14, wherein the calibration objective function is the average distance from a set of random sequences to the identity.

19. The platform of claim 14, wherein the shared classical memory is connected to both the first QPU and the second QPU, and the shared classical memory is configured to share data between the first QPU and the second QPU.

20. The platform of claim 14, comprising:
  a quantum communication link between the first QPU and the second QPU for teleportation of quantum states.

* * * * *